United States Patent
Sterniak

(10) Patent No.: US 10,150,474 B2
(45) Date of Patent: Dec. 11, 2018

(54) REDUCING LATERAL POSITION DEVIATION DURING AN AUTOMATED LANE CHANGE

(71) Applicant: Robert Bosch GmbH, Stuttgart (DE)

(72) Inventor: Jeffrey S. Sterniak, Canton, MI (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/398,222

(22) Filed: Jan. 4, 2017

(65) Prior Publication Data
US 2018/0186371 A1    Jul. 5, 2018

(51) Int. Cl.
| | |
|---|---|
| *B60W 30/10* | (2006.01) |
| *G05D 1/00* | (2006.01) |
| *G05D 1/02* | (2006.01) |
| *B62D 5/04* | (2006.01) |
| *B62D 6/04* | (2006.01) |
| *B62D 6/08* | (2006.01) |
| *B62D 15/02* | (2006.01) |
| *B60W 30/02* | (2012.01) |
| *B60W 30/095* | (2012.01) |
| *G06K 9/00* | (2006.01) |
| *G08G 1/16* | (2006.01) |

(52) U.S. Cl.
CPC ............ *B60W 30/10* (2013.01); *B60W 30/02* (2013.01); *B60W 30/0956* (2013.01); *B62D 5/04* (2013.01); *B62D 6/04* (2013.01); *B62D 6/08* (2013.01); *B62D 15/02* (2013.01); *G05D 1/0088* (2013.01); *G05D 1/021* (2013.01); *G05D 1/0212* (2013.01); *G06K 9/00791* (2013.01); *G08G 1/168* (2013.01); *B60W 2550/143* (2013.01); *B60W 2710/081* (2013.01); *B60W 2710/20* (2013.01)

(58) Field of Classification Search
CPC .......... B60W 30/10; B60W 2550/143; B60W 2710/081; B60W 2710/20; G05D 1/0088; G05D 1/0212
See application file for complete search history.

(56) References Cited

U.S. PATENT DOCUMENTS

| | | | |
|---|---|---|---|
| 5,485,378 A * | 1/1996 | Franke | B62D 15/025 348/118 |
| 5,765,116 A | 6/1998 | Wilson-Jones et al. | |
| 7,392,120 B2 * | 6/2008 | Matsumoto | B60T 8/17557 180/168 |
| 7,421,334 B2 | 9/2008 | Dahlgren et al. | |

(Continued)

FOREIGN PATENT DOCUMENTS

| | | | | |
|---|---|---|---|---|
| EP | 0743661 A3 * | 12/1996 | | B61C 3/00 |
| EP | 0781695 A2 * | 7/1997 | | B60T 8/17551 |

(Continued)

*Primary Examiner* — Tuan C To
(74) *Attorney, Agent, or Firm* — Michael Best & Friedrich LLP

(57) ABSTRACT

A method and system for controlling a lane change maneuver of an autonomous vehicle. The method includes detecting a feature of a road surface with a sensor and determining, at an electronic processor, a road camber of a target lane based on the feature. The target lane is a traffic lane targeted for a lane change maneuver by the autonomous vehicle. The method further includes determining a lateral compensating force based on the road camber and applying the lateral compensating force, by the electronic processor, during the lane change maneuver.

20 Claims, 5 Drawing Sheets

(56) References Cited

U.S. PATENT DOCUMENTS

| | | | |
|---|---|---|---|
| 8,392,064 B2 | 3/2013 | Thrun et al. | |
| 8,841,994 B2 | 9/2014 | Li et al. | |
| 8,903,607 B2* | 12/2014 | Lee | B62D 15/0255 |
| | | | 180/408 |
| 9,229,453 B1* | 1/2016 | Lee | G05D 1/0214 |
| 9,513,632 B1* | 12/2016 | Gordon | G05D 1/0061 |
| 9,731,755 B1* | 8/2017 | Moshchuk | B62D 1/28 |
| 9,731,762 B2* | 8/2017 | Hass | B62D 15/0265 |
| 9,789,880 B2* | 10/2017 | Sweeney | B60W 50/16 |
| 2002/0035871 A1* | 3/2002 | Pallot | B60T 8/1755 |
| | | | 73/489 |
| 2008/0091318 A1* | 4/2008 | Deng | B62D 6/003 |
| | | | 701/41 |
| 2013/0030602 A1* | 1/2013 | Joeng | B60W 30/12 |
| | | | 701/1 |
| 2013/0069773 A1 | 3/2013 | Li et al. | |
| 2013/0231779 A1* | 9/2013 | Purkayastha | B25J 9/1697 |
| | | | 700/259 |
| 2014/0032017 A1* | 1/2014 | Anderson | B60W 30/09 |
| | | | 701/3 |
| 2014/0343790 A1 | 11/2014 | Hestermeyer et al. | |
| 2015/0158528 A1* | 6/2015 | Moshchuk | B62D 15/0265 |
| | | | 701/41 |
| 2015/0166062 A1* | 6/2015 | Johnson | B60W 30/12 |
| | | | 701/41 |
| 2015/0274164 A1 | 10/2015 | Terazawa et al. | |
| 2016/0096546 A1* | 4/2016 | Chia | B62D 6/08 |
| | | | 701/41 |
| 2016/0114832 A1* | 4/2016 | Taniguchi | B62D 6/008 |
| | | | 701/41 |
| 2017/0253254 A1* | 9/2017 | Sweeney | B60W 50/16 |
| 2017/0277960 A1* | 9/2017 | Ramasamy | G05D 1/0088 |
| 2017/0334444 A1* | 11/2017 | Hawes | B60G 17/0165 |
| 2017/0369051 A1* | 12/2017 | Sakai | B60W 30/09 |
| 2018/0173970 A1* | 6/2018 | Bayer | G06K 9/00798 |

FOREIGN PATENT DOCUMENTS

| | | | | |
|---|---|---|---|---|
| EP | 1336550 A2 | 8/2003 | | |
| EP | 1726513 A1 | 11/2006 | | |
| JP | 2001331899 A | * 11/2001 | | |
| WO | WO-2016104042 A1 | * 6/2016 | | B60W 50/14 |

\* cited by examiner

REDUCING LATERAL POSITION DEVIATION DURING AN AUTOMATED LANE CHANGE

FIELD

Embodiments relate to a control systems for an autonomous vehicle.

BACKGROUND

Modern vehicles include various autonomous driving functions, for example adaptive cruise-control, lane change assistance, collision avoidance systems, self-parking, and the like. Fully autonomous driving is a goal, but has not yet been achieved.

SUMMARY

Embodiments provide a technique to reduce lateral position deviation during an automated lane change due to changes in road camber between the originating traffic lane and the target traffic lane. Road camber introduces a lateral force on a vehicle performing a lane change. To maintain a particular trajectory during the lane change, a compensating force may be applied by the vehicle steering or trajectory control system to maintain the trajectory during the lane change and to maintain a desired position within the target lane. The camber between lanes on a given road may differ substantially between adjacent lanes. As a consequence, different magnitudes and directions of compensating force may be required to maintain a trajectory. During an automated lane change, the vehicle trajectory control system may adapt to changes in compensating force to prevent unwanted deviations from the position within the target lane.

Having knowledge of the target lane's camber relative to the originating lane allows for a feed-forward compensation of the lateral compensating force to minimize position deviations, and, if desired, modification of a desired vehicle trajectory. Feed-forward compensation may also be implemented to control lateral forces on vehicle occupants during the lane change maneuver. Once the target lane camber is determined, the lateral forces generated on the vehicle may be pre-determined with a vehicle model incorporating roll. The lateral forces due to the target lane camber may be compensated for by using an actuator controlling vehicle yaw or lateral motion (for example, steering actuator(s), differential braking, or torque vectoring). The lane change trajectory may also be modified in order to more accurately produce desired lateral forces on the vehicle occupants.

Accounting for road camber in the feed-forward lateral control path reduces lateral position deviation during a lane change, thereby improving the comfort and safety of the automated lane change maneuver. Embodiments provide, among other things, a system and a method for determining a lateral compensating force and adjusting the vehicle's steering or trajectory control based on the lateral compensating force.

One embodiment provides a method of performing a lane change maneuver for an autonomous vehicle. The method includes detecting a feature of a road surface with a sensor and determining, with an electronic processor, a road camber of a target lane based on the feature. The target lane is a traffic lane targeted for a lane change maneuver by the autonomous vehicle. The method further includes determining a lateral compensating force based on the road camber and applying the lateral compensating force, by the electronic processor, during the lane change maneuver.

Another embodiment provides a lane change control system of an autonomous vehicle. The lane change control system includes a sensor and an electronic processor communicatively connected to the sensor. The electronic processor is configured to detect a feature of a road surface with the sensor and determine a road camber of a target lane based on the feature. The target lane is a traffic lane targeted for a lane change maneuver by the autonomous vehicle. The electronic processor is further configured to determine a lateral compensating force based on the road camber and apply the lateral compensating force during the lane change maneuver.

Other aspects, features, and embodiments will become apparent by consideration of the detailed description and accompanying drawings.

DETAILED DESCRIPTION

Before any embodiments are explained in detail, it is to be understood that this disclosure is not intended to be limited in its application to the details of construction and the arrangement of components set forth in the following description or illustrated in the following drawings. Embodiments are capable of other configurations and of being practiced or of being carried out in various ways.

A plurality of hardware and software based devices, as well as a plurality of different structural components may be used to implement various embodiments. In addition, embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable medium) executable by one or more processors. For example, "control units" and "controllers" described in the specification can include one or more electronic processors, one or more memory modules including non-transitory computer-readable medium, one or more input/output interfaces, one or more application specific integrated circuits (ASICs), and various connections (for example, a system bus) connecting the various components.

Figure 1:
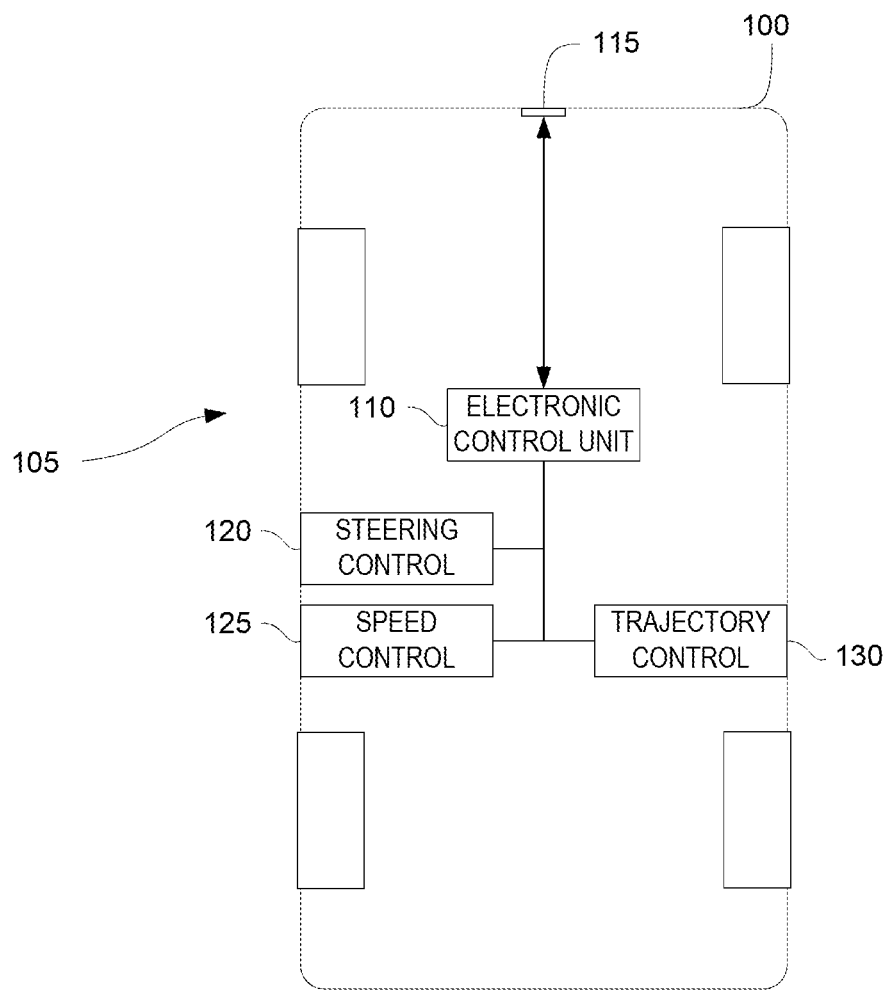
FIG. 1 is a block diagram of an autonomous vehicle equipped with a lane change control system according to one embodiment.

FIG. 1 provides an illustrative example of an autonomous vehicle 100 equipped with a lane change control system 105. The autonomous vehicle 100, although illustrated as a four-wheeled vehicle, may encompass various types and designs of vehicles. For example, the autonomous vehicle 100 may be an automobile, a motorcycle, a truck, a bus, a semi-tractor, and others. The autonomous vehicle 100 may not be fully autonomous but includes at least some autonomous functionality. Thus, the autonomous vehicle 100 may require a driver or operator to perform some driving functions. In the example illustrated, the lane change control system 105 includes several hardware components including an electronic control unit (ECU) 110 and a sensor 115. The lane change control system 105 also includes a steering control 120 and a speed control 125, which although illustrated as separate components from the electronic control unit 110, may include hardware and software modules that are completely or at least partially incorporated within the electronic control unit 110. In addition, the steering control 120 may include active steering and yaw control. The components of the lane change control system 105 may be of various constructions and may use various communication types and protocols.

The electronic control unit 110 may be communicatively connected to the sensor 115, the steering control 120, and the speed control 125 via various wired or wireless connections. For example, in some embodiments, the electronic control unit 110 is directly coupled via a dedicated wire to each of the above-listed components of the lane change control system 105. In other embodiments, the electronic control unit 110 is communicatively coupled to one or more of the components via a shared communication link such as a vehicle communication bus (for example, a controller area network (CAN) bus) or a wireless vehicle network.

The sensor 115 may be implemented using multiple sensors, sensor arrays, multiple sensing components, and multiple different types of sensors. The sensor 115 may be positioned at various places on or within the autonomous vehicle 100. The sensor 115 may have a field of view that extends, at least in part, to an area including an adjacent traffic lane. In one example, the sensor 115, or components thereof, is externally mounted to a portion of the autonomous vehicle 100 (for example, on a side mirror or front end). In another example, the sensor 115, or components thereof, is internally mounted within the autonomous vehicle 100 (for example, positioned on the dashboard or by the rearview mirror). In some embodiments, the sensor 115 includes a single video camera, multiple video cameras creating a stereo field of view, light detection and ranging (lidar) sensors, or some combination of the foregoing. The sensor 115 is configured to sense a profile of at least a portion of the road surface, a position of lane markings, or both.

In another example of the components of the lane change control system 105, the steering control 120 may include a steering angle sensor, a steering actuator, and other components that directly or indirectly (for example, by differential braking, heading control, or yaw control) control the trajectory of the autonomous vehicle. The speed control 125 may include an electronically controlled device (for example, a throttle) and associated software for controlling power delivered to an engine of the autonomous vehicle 100. In some embodiments, the speed control 125 also includes braking controls (for example, an electronic brake controller) and braking components that, in coordination, control the braking force of the autonomous vehicle 100, and thereby control the speed and direction of the autonomous vehicle 100.

Each of the above-listed components of the lane change control system 105 may include dedicated processing circuitry including an electronic processor and memory for receiving, processing, and transmitting data associated with the functions of each component. For example, the sensor 115 may include an electronic processor that determines parameters relating to the ground surface and the lane markers. In this case, the sensor 115 transmits the parameters or calculated values associated with the parameters to the electronic control unit 110. Each of the components of the lane change control system 105 may communicate with the electronic control unit 110 using various communication protocols. The embodiment illustrated in FIG. 1 provides but one example of the components and connections of the lane change control system 105. However, these components and connections may be constructed in other ways than those illustrated and described herein.

Figure 2:
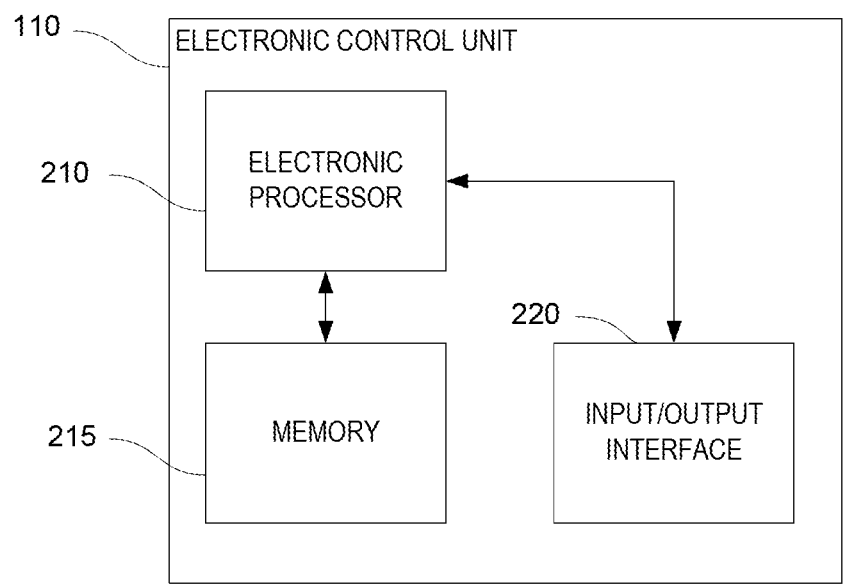
FIG. 2 is a block diagram of an electronic control unit of the lane change control system of FIG. 1 according to one embodiment.

FIG. 2 is a block diagram of the electronic control unit 110 of the lane change control system 105 according to one embodiment. The electronic control unit 110 includes a plurality of electrical and electronic components that provide power, operation control, and protection to the components and modules within the electronic control unit 110. The electronic control unit 110 includes, among other things, an electronic processor 210 (such as a programmable electronic microprocessor, microcontroller, or similar device), a memory 215 (for example, non-transitory, machine readable memory), and an input/output interface 220. The electronic processor 210 is communicatively connected to the memory 215 and the input/output interface 220. The electronic processor 210, in coordination with the memory 215 and the input/output interface 220, is configured to implement, among other things, the methods described herein.

Figure 3:
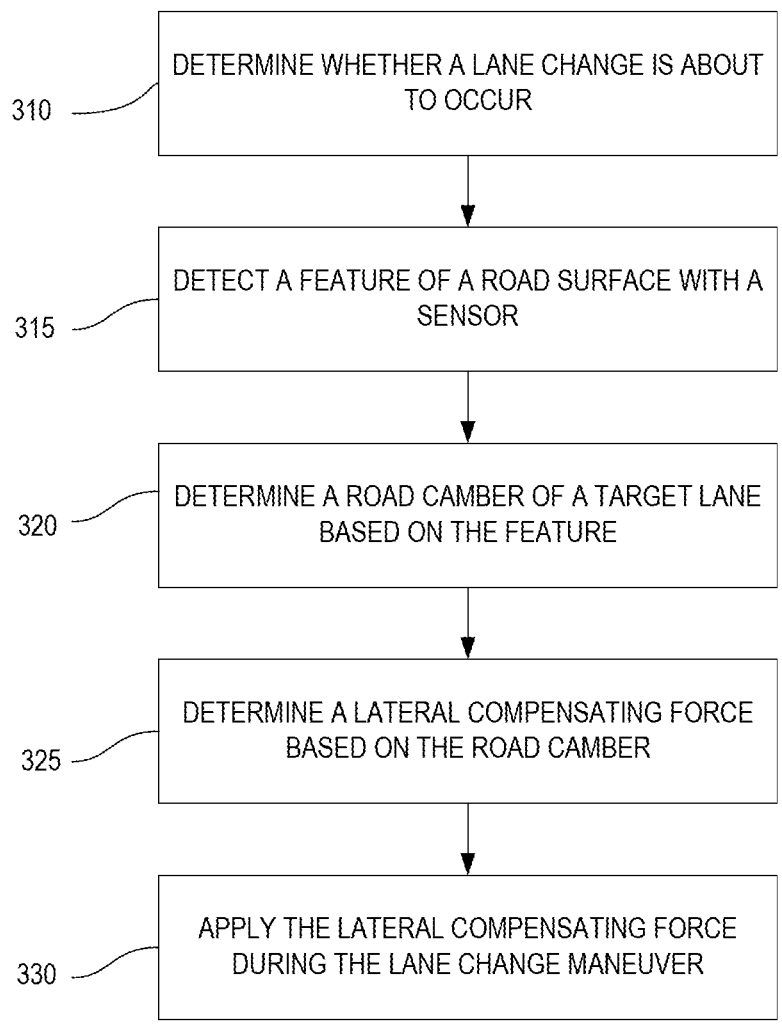
FIG. 3 is a flowchart of a method of operating the lane change control system of FIG. 1 according to one embodiment.

The electronic control unit 110 may be implemented in several independent controllers (for example, programmable electronic control units) each configured to perform specific functions or sub-functions. Additionally, the electronic control unit 110 may contain sub-modules that include additional electronic processors, memory, or application specific integrated circuits (ASICs) for handling input/output functions, processing of signals, and application of the methods listed below. In other embodiments, the electronic control unit 110 includes additional, fewer, or different components FIG. 3 illustrates a method of operating the autonomous vehicle 100 with the lane change control system 105 according to one embodiment. In the illustrated method, the electronic processor 210 determines whether a lane change is about to occur (block 310). For example, the electronic processor 210 may receive a lane change request from another control system in the autonomous vehicle 100 or may initiate a lane change decision internally. When the lane change is about to occur, the electronic processor 210 detects a feature of a road surface with the sensor 115 (block 315). In some embodiments, the electronic processor 210 creates an image of the road surface with the sensor 115.

In some embodiments, the electronic processor 210 may receive camera images from the sensor 115 and compare the camera images to determine disparities in the images. The electronic processor 210 may determine geometric properties of the road surface, or a portion thereof, including slope, shape, profile and orientation using the images. The electronic processor 210 may analyze one or more images from one or more stereo cameras, lidar sensors, or both to determine the geometric properties of the road surface.

Figure 4A:
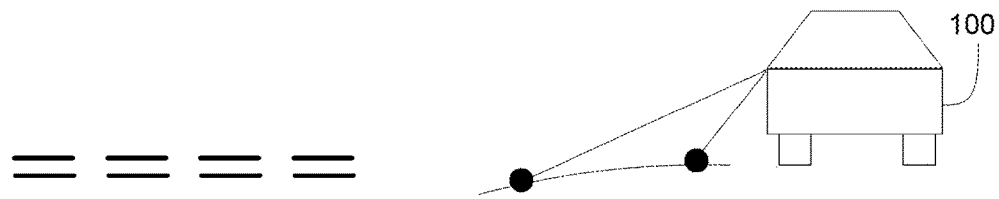
FIGS. 4A-4C are diagrams of images of traffic lane markings and of detection of the traffic lane markings by the lane change control system of FIG. 1 according to one embodiment.
Figure 4B:
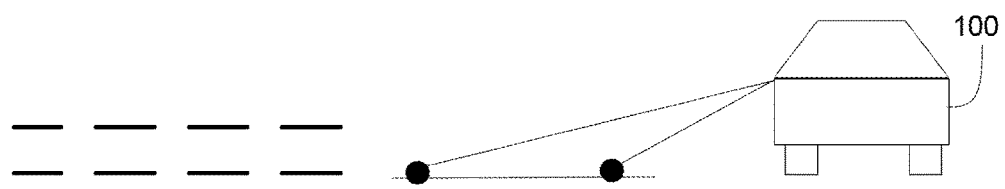
Figure 4C:
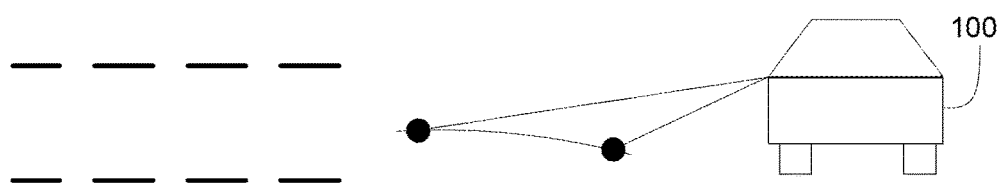

In other embodiments, the electronic processor 210 detects traffic lane markers such as dashed lines or reflectors with the sensor 115 as illustrated in FIGS. 4A-4C. In this case, the electronic processor 210 may receive images depicting the traffic lane markers in a target lane (the traffic lane targeted for the lane change). The images may be generated from forward facing, rear facing, side facing cameras, or lidar. The electronic processor 210 identifies a traffic lane marker dividing the current lane of travel with the target lane and a traffic lane marker indicative of the opposite side of the target lane. The electronic processor 210 may determine a distance in the received image between these two traffic lane markers, as illustrated on the left side of FIGS. 4A-4C. In particular, the left side of FIGS. 4A-4C depict the traffic lane markers within the image received at the electronic processor 210. When the distance between the traffic lane markers appears small, as shown on the left side of FIG. 4A, this indicates a positive road camber as shown on the right side of FIG. 4A. When the distance between the traffic lane markers appears nominal, as shown on the left side of FIG. 4B, this indicates a relatively flat surface as shown on the right side of FIG. 4B. When the distance between the traffic lane markers appears large, as shown on the left side of FIG. 4C, this indicates a negative road camber as shown on the right side of FIG. 4C. The actual classification of small, nominal, or large may be performed based on the signal from the sensor 115 given an estimate of the actual adjacent lane width from sensor or map data.

Returning to the discussion of the method illustrated in FIG. 3, the electronic processor 210 then determines a road camber based on the features (block 320). The features may include road geometry, traffic lane markers, or both as discussed above. The road camber may also be determined using various different techniques or a combination of different techniques. For example, the road camber may be determined based on identification of the orientation of vehicles surrounding the autonomous vehicle 100, based on gravity vector determination through inertial sensing, based on road camber data provided in high definition road maps (for example, with data of road camber gathered from crowd sourcing), or a combination of the foregoing techniques.

In one example, when detecting traffic lane markers, the electronic processor 210 may determine the road camber based on the distance between the traffic lane markers in the image and correlating this distance with known values of an actual distance between road markers. Once the road camber is determined, using one or more of the above-listed techniques, the electronic processor 210 determines a lateral compensating force based on the road camber (block 325). This may include predicting the lateral forces impinging on the autonomous vehicle 100 during the lane change maneuver. Performing a lane change maneuver over a road surface with a changing road camber results in changes in the lateral forces experienced by the occupants of the autonomous vehicle 100. For example, when the autonomous vehicle 100 changes lanes, the road camber between these lanes may change, resulting in a change in the lateral forces on the autonomous vehicle 100. The lateral compensating force counteracts the lateral force due to the road camber. The lateral compensating force may be set to a value that negates the lateral force by applying the compensating force in an equal and opposite direction to the lateral force due to road camber. This may create the effect of performing a lane change on a road surface with zero road camber or with no changes in road camber across traffic lanes. In some embodiments, the compensating force may be variable and adjusted to continuously counteract the changes in lateral force that occur due to a changing road camber.

Determining the lateral compensating force may include predicting the lateral force due to the road camber that will occur during the lane change. The lateral force due to the road camber may be partially dependent on various characteristics of the autonomous vehicle 100 such as weight, handling, speed, and others. As a consequence, the determination of the lateral compensating force may also be based on one or more of these predetermined characteristics of the autonomous vehicle 100. The lateral force due to the road camber also depends on the planned trajectory of the lane change. The electronic processor 210 may determine the lateral compensating force based on the planned trajectory whether the planned trajectory is predetermined or calculated by the electronic processor 210 in response to a lane change request.

In one embodiment, once the lateral compensating force is determined, the electronic processor 210 applies the lateral compensating force during the lane change maneuver (block 330). For example, the electronic processor 210 may adjust the steering control 120, the speed control 125, or both by applying a feed-forward control signal based on the lateral compensating force. The feed-forward control signal then counteracts the lateral force due to road camber throughout the lane change maneuver. In some embodiments, the electronic processor 210 applies the lateral compensating force to assist a driver in performing a manual lane change maneuver. In this case, the electronic processor 210 assists the driver by automatically compensating for road camber and changes in the lateral forces on the autonomous vehicle 100 when the autonomous vehicle 100 is being operating manually.

Figure 5:
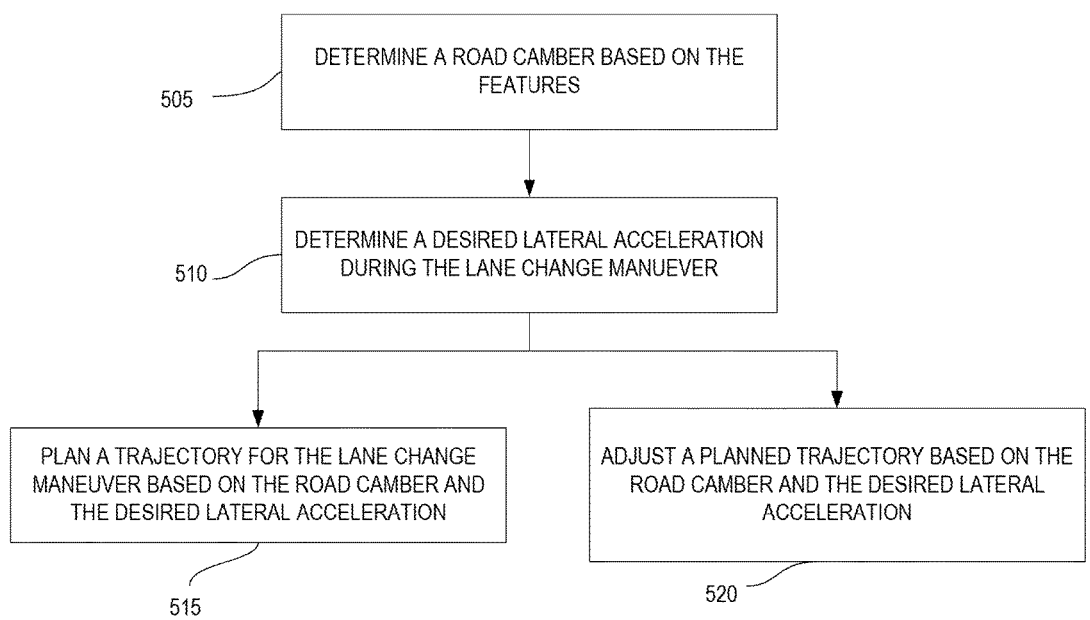
FIG. 5 is a flowchart of a method of operating the lane change control system of FIG. 1 according to another embodiment.

FIG. 5 illustrates a method of operating the autonomous vehicle 100 with the lane change control system 105 according to another embodiment. More particularly, FIG. 5 illustrates a method of determining or adjusting an already determined trajectory for a lane change maneuver based on the road camber. In the illustrated method, the electronic processor 210 determines the road camber of the target lane based on the features (block 505) according to the techniques described above. The electronic processor 210 determines a desired lateral acceleration during the lane change maneuver (block 510). The desired lateral acceleration is an approximate amount of lateral acceleration that occupants of the autonomous vehicle 100 feel comfortable experiencing.

In some embodiments, the electronic processor 210 then plans a trajectory for the lane change maneuver based on the road camber and the desired lateral acceleration. Since the road camber may affect the amount of lateral acceleration that the occupants of the autonomous vehicle 100 are exposed to, the electronic processor 210 may plan the trajectory to compensate for the road camber change between lanes. For example, in road conditions with a high amount of change in road camber, occupants may experience higher levels of lateral acceleration than with road conditions with a low amount of change of road camber for a particular trajectory. To compensate for high levels of change in the road camber, the electronic processor 210 may plan or determine a trajectory to accomplish a slower lane change maneuver to maintain a value of the lateral acceleration below the desired lateral acceleration.

In other embodiments, the electronic processor adjusts a planned trajectory based on the road camber and the desired lateral acceleration (block 520). In this case, the planned trajectory is at least in part predetermined or preprogrammed. The planned trajectory may also be generated by another electronic control unit within the autonomous vehicle 100. In these cases, the electronic processor 210 adjusts the planned trajectory to maintain a value of the lateral acceleration below the desired lateral acceleration.

In some embodiments, the electronic processor 210 determines the lateral compensating force by setting the lateral compensating force to achieve the desired lateral acceleration of the autonomous vehicle 100. In this case, applying the lateral compensating force (as illustrated in block 330) may include planning a trajectory for the lane change maneuver that is based, at least in part, on achieving the desired lateral acceleration of the autonomous vehicle 100. Similarly, applying the lateral compensating force may also including adjusting the planned trajectory for the lane change maneuver based on achieving the desired lateral acceleration of the autonomous vehicle 100.

In yet other embodiments, the electronic processor 210 performs lane change assist the above-listed methods Various features, advantages, and embodiments are set forth in the following claims.

What is claimed is:

1. A method of operating an autonomous vehicle, the method comprising:
   detecting a feature of a road surface with a sensor;
   determining, with an electronic processor, a road camber of a target lane based on the feature, the target lane being a traffic lane targeted for a lane change maneuver by the autonomous vehicle;
   determining, with the electronic processor, a lateral compensating force based on the road camber;
   controlling, with the electronic processor, a lane change control system to apply the lateral compensating force during the lane change maneuver,
   wherein the lane change control system includes at least one selected from the group consisting of a steering actuator, a differential braking system, and a torque vectoring system.

2. The method according to claim 1, wherein determining the lateral compensating force includes predicting a lateral force due to the road camber on the autonomous vehicle, the lateral force occurring during the lane change maneuver.

3. The method according to claim 2, wherein predicting the lateral force due to the road camber is based on predetermined characteristics of the autonomous vehicle.

4. The method according to claim 2, wherein predicting the lateral force due to the road camber is based on a planned trajectory of the lane change maneuver.

5. The method according to claim 2, wherein determining the lateral compensating force includes setting the lateral compensating force equal and opposite to the lateral force due to the road camber.

6. The method according to claim 1, wherein determining the lateral compensating force includes setting the lateral compensating force to achieve a desired lateral acceleration of the autonomous vehicle.

7. The method according to claim 6, wherein controlling the lane change control system to apply the lateral compensating force, by the electronic processor, during the lane change maneuver includes planning a trajectory for the lane change maneuver that is based, at least in part, on achieving the desired lateral acceleration of the autonomous vehicle.

8. The method according to claim 1, wherein detecting the feature of the road surface includes detecting a profile of a portion of the road surface using stereo cameras, and wherein determining the road camber of the target lane includes determining the road camber based on the profile of the portion of the road surface.

9. The method according to claim 1, wherein detecting the feature of the road surface includes detecting a profile of a portion of the road surface using a lidar sensor, and wherein determining the road camber of the target lane includes determining the road camber based on the profile of the portion of the road surface.

10. The method according to claim 1, wherein detecting the feature of the road surface includes detecting lane markers within an image generated by the sensor, wherein determining the road camber of the target lane includes determining a distance between detected lane markers within the image and determining the road camber based on the distance between detected lane markers within the image and a known value of an actual distance between road markers.

11. A lane change control system of an autonomous vehicle comprising:
   a sensor; and
   an electronic processor communicatively connected to the sensor, the electronic processor configured to
      detect a feature of a road surface with the sensor,
      determine a road camber of a target lane based on the feature, the target lane being a traffic lane targeted for a lane change maneuver by the autonomous vehicle,
      determine a lateral compensating force based on the road camber, and
      control the lane change control system to apply the lateral compensating force during the lane change maneuver,
   wherein the lane change control system includes at least one selected from a group consisting of a steering actuator, a differential braking system, and a torque vectoring system.

12. The lane change control system according to claim 11, wherein the electronic processor is further configured to predict a lateral force due to the road camber on the autonomous vehicle, the lateral force occurring during the lane change maneuver.

13. The lane change control system according to claim 12, wherein the electronic processor is further configured to predict the lateral force due to the road camber based on predetermined characteristics of the autonomous vehicle.

14. The lane change control system according to claim 12, wherein the electronic processor is further configured to predict the lateral force due to the road camber based on a planned trajectory of the lane change maneuver.

15. The lane change control system according to claim 12, wherein the electronic processor is further configured to set the lateral compensating force equal and opposite to the lateral force due to the road camber.

16. The lane change control system according to claim 11, wherein the electronic processor is further configured to set the lateral compensating force to achieve a desired lateral acceleration of the autonomous vehicle.

17. The lane change control system according to claim 16, wherein the electronic processor is further configured to plan a trajectory for the lane change maneuver that is based, at least in part, on achieving the desired lateral acceleration of the autonomous vehicle.

18. The lane change control system according to claim 11, wherein the electronic processor is further configured to detect a profile of a portion of the road surface using stereo cameras and to determine the road camber based on the profile of the portion of the road surface.

19. The lane change control system according to claim 11, wherein the electronic processor is further configured to detect a profile of a portion of the road surface using a lidar sensor and to determine the road camber based on the profile of the portion of the road surface.

20. The lane change control system according to claim 11, wherein the electronic processor is further configured to detect lane markers within an image generated by the sensor, determine a distance between detected lane markers within the image, and to determine the road camber based on the distance between detected lane markers within the image and a known value of an actual distance between road markers.

* * * * *